United States Patent
Miyata et al.

(10) Patent No.: US 6,917,732 B2
(45) Date of Patent: Jul. 12, 2005

(54) CONNECTING METHOD OF OPTICAL FUNCTION DEVICES, AND OPTICAL APPARATUS

(75) Inventors: Hideyuki Miyata, Kawasaki (JP); Yoshihiko Kaitoh, Sapporo (JP); Tadao Nakazawa, Kawasaki (JP); Masaharu Doi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/855,527

(22) Filed: May 28, 2004

(65) Prior Publication Data

US 2004/0218866 A1 Nov. 4, 2004

Related U.S. Application Data

(62) Division of application No. 10/106,360, filed on Mar. 27, 2002.

(30) Foreign Application Priority Data

Dec. 28, 2001 (JP) ........................................ 2001-399239

(51) Int. Cl.[7] ........................... G02B 6/12; G02B 6/126; G02B 6/30; G02B 6/27
(52) U.S. Cl. ............................. 385/15; 385/11; 385/14; 385/47; 385/49; 385/50
(58) Field of Search ........................... 385/4, 7, 11, 16, 385/31, 36, 39, 47, 49, 14, 50

(56) References Cited

U.S. PATENT DOCUMENTS

| | | | | |
|---|---|---|---|---|
| 3,943,021 A | * | 3/1976 | Lindsey | ........................ 385/15 |
| 4,327,340 A | | 4/1982 | Coldren | |
| 4,790,615 A | | 12/1988 | Seki et al. | |
| 5,000,530 A | * | 3/1991 | Takahashi | ..................... 385/24 |
| 5,218,653 A | | 6/1993 | Johnson et al. | |
| 5,652,809 A | | 7/1997 | Aronson | |
| 5,701,372 A | * | 12/1997 | Magel et al. | .................. 385/24 |
| 5,796,510 A | | 8/1998 | Yao | |
| 5,818,984 A | | 10/1998 | Ahmad et al. | |
| 5,850,492 A | | 12/1998 | Morasca et al. | |
| 6,061,481 A | | 5/2000 | Heidrich et al. | |
| 6,243,517 B1 | | 6/2001 | Deacon | |
| 6,337,931 B1 | * | 1/2002 | Seino | ........................... 385/11 |
| 6,538,787 B1 | * | 3/2003 | Moeller et al. | ................ 385/11 |
| 6,718,076 B2 | * | 4/2004 | Bures et al. | .................... 385/7 |

FOREIGN PATENT DOCUMENTS

| | | |
|---|---|---|
| EP | 2 240 682 A | 8/1991 |
| JP | 08-114776 | 5/1996 |
| JP | 08-211349 | 8/1996 |
| JP | 08-286160 | 11/1996 |
| JP | 09-090303 | 4/1997 |
| JP | 11-064809 | 3/1999 |

OTHER PUBLICATIONS

European Search Report, dated Mar. 3, 2004, for related European Patent Application No. 02 00 7204.

* cited by examiner

*Primary Examiner*—Akm Enayet Ullah
*Assistant Examiner*—Omar Rojas
(74) *Attorney, Agent, or Firm*—Staas & Halsey LLP

(57) ABSTRACT

The present invention aims at providing a connecting method capable of suppressing an influence of stray light for a plurality of optical function devices formed on the same substrate, and an optical apparatus applied with the control method. To this end, in the connecting method of optical function devices according to the present invention, the plurality of optical function devices formed on the same substrate are cascade connected so that both ends of an optical path passing through the plurality of optical function devices are positioned on the same end face of the substrate. According to such a connecting method, it becomes possible to effectively suppress a leakage of stray light from an optical input side to an optical output side.

8 Claims, 14 Drawing Sheets

CROSS-CONNECTION

PANDA TYPE FIBER

| PROPAGATION DIRECTION OF LIGHT AND SAW | WAVELENGTH Λ OF SAW SENSED BY LIGHT |
|---|---|
| STATIC (ACOUSTIC VELOCITY = 0) | $\Lambda_0$ — PROPAGATION DIRECTION OF LIGHT |
| FORWARD DIRECTION | $\Lambda_+$ — PROPAGATION DIRECTION OF SAW |
| REVERSE DIRECTION | $\Lambda_-$ — PROPAGATION DIRECTION OF SAW |

SELECTED WAVELENGTH

EXAMPLE OF CONVENTIONAL PARALLEL
CONNECTION OF OPTICAL FUNCTION DEVICES

EXAMPLE OF CONVENTIONAL CASCADE
CONNECTION OF OPTICAL FUNCTION DEVICES

IN CASE OF TWO-STAGED STRUCTURE

EXAMPLE OF CONVENTIONAL CASCADE
CONNECTION OF OPTICAL FUNCTION DEVICES

IN CASE OF THREE-STAGED STRUCTURE

CONNECTING METHOD OF OPTICAL FUNCTION DEVICES, AND OPTICAL APPARATUS

CROSS-REFERENCE TO RELATED APPLICATIONS

This application is a divisional of application Ser. No. 10/106,360 filed Mar. 27, 2002 which is currently pending.

BACKGROUND OF THE INVENTION

(1) Field of the Invention

The present invention relates to a technique for connecting a plurality of optical function devices formed on the same substrate, in particular, to a connecting method capable of suppressing a leakage of stray light from an optical input side to an optical output side, and an optical apparatus applied with the connecting method.

(2) Related Art

There have been demanded developments of optical communication systems and optical signal processing systems capable of constructing networks of large capacities and ultra-long distance with an explosive increase of Internet Protocol (IP) data communication demand. In a transmission system adopting a wavelength-division multiplexing (WDM) transmission as a basic technique thereof, it is possible to realize the large capacity transmission and easily perform the division-multiplication with the wavelength as a unit, so that the construction of flexible optical networks that performs multiplication-division of different kinds of services at optical levels, such as, optical cross-connecting (OXC), optical add/drop multiplexing (OADM) and the like. Therefore, the development and manufacturing of transmission apparatus and signal processing apparatus using the above system have been remarkably made.

In these apparatuses, there are utilized many optical function devices, such as, an optical switch having functions for switching ON/OFF of light, for attenuating the light, for switching to 1×n, or the like, a wavelength filter that separates a signal light for each wavelength, or the like. Specifically, the optical switch (including an attenuator) is used, for example, for adjusting the levels of respective wavelengths at a wavelength division multiplexing section on the sending side, for Automatic Level Control (ALC) controlling by an optical amplifier, for wavelength switching in the OXC and OADM, for switching ON/OFF of light and the like. Further, the optical filter is used, for example, for wavelength switching in the OXC and OADM, for separating the respective wavelengths on the receiving side, for cutting off Amplified Spontaneous Emission (ASE) light and the like.

By forming these optical function devices on a substrate made of $SiO_2$, $LiNbO_3$ and the like, it becomes possible to achieve the high functions, down-sizing, integration, reduction of electricity, and reduction of cost. The plurality of optical function devices integrated on the substrate are used individually in parallel with one another, for example, as shown in FIG. 17, or are cascade connected in a multi-staged structure to be used, for example, as shown in FIG. 18A and FIG. 18B, so as to achieve the respective functions thereof. Thus, in a case where the respective optical function devices are used individually in parallel with one another, an effect owing to the integration becomes large. Further, in a case where the respective optical function devices are cascade connected in a multi-staged structure to be used, it becomes possible to achieve the improvement of extinction ratio, if the optical function devices are optical switches, while if the optical function devices are optical filters, such as, acousto-optic tunable filters (AOTFs), it becomes possible to achieve the narrow transmission band, the improvement of suppression ratio between other channels, and the improvement of extinction ratio when used as notch filters. Moreover, if devices having different functions from one another are cascade connected in a multi-staged structure to be used, it becomes possible to achieve a high function and the like.

However, in a case where a plurality of optical function devices integrated on the substrate are connected to be used, most of the input light from a substrate input section passes through the optical function devices, however, as shown by an arrow in dotted line in FIG. 17 and FIGS. 18A and 18B, a part of the input light is emitted into the substrate, and bypasses the optical function devices as a stray light, to be coupled to an output section. The coupling of this stray light to the output section causes deterioration of extinction ratio, in a case where the optical function devices are optical switches. Further, in a case where the optical function devices are optical filters, such as AOTFs and the like, the coupling of this stray light to the output section causes deterioration of suppression ratio between other channels or deterioration of extinction ratio at the time when the AOTFs are used as notch filters.

Specifically, as one example, the consideration is made on an optical switch having characteristics in which an optical insertion loss is 10 dB and an extinction ratio at an optical function portion is 40 dB, as shown in a solid line in FIG. 19, in a case where a level difference of stray light to an input light is 40 dB, the extinction ratio of the optical switch is about 30 dB. In a case where the level difference of stray light to an input light is 50 dB, the extinction ratio is about 37 dB. Thus, the extinction ratio of the optical switch is restricted by an influence of stray light. If a required value of extinction ratio of the optical switch is assumed to be 40 dB, the required value cannot be achieved even if the level difference of stray light to the input light is 50 dB or more. Therefore, it is necessary to make the stray light level negligibly smaller compared to the extinction ratio at the optical function portion.

SUMMARY OF THE INVENTION

The present invention has been achieved in view of the above problems, and an object of the present invention is to provide a connecting method capable of suppressing an influence of stray light in a plurality of optical function devices formed on the same substrate, and an optical apparatus applied with the connecting method.

In order to achieve the above object, one aspect of a connecting method of the present invention, for connecting a plurality of optical function devices formed on the same substrate, is constituted such that the plurality of optical function devices are cascade connected, so that both ends of an optical path passing through the plurality of optical function devices are positioned on the same end face of the substrate.

Further, one aspect of an optical apparatus according to the present invention comprises a plurality of optical function devices formed on the same substrate, and a cascade connecting section that cascade connects the plurality of optical function devices so that both ends of an optical path passing through the plurality of optical function devices are positioned on the same end face of the substrate.

According to the connecting method and the optical apparatus as described above, a light is input/output to/from the same end face of the substrate, for the plurality of optical function devices cascade connected. Thus, there is reduced the rate that a stray light generated on an optical input side bypasses the respective optical function devices to be coupled to the light being propagated within the optical path on an optical output side. Thereby, it becomes possible to suppress effectively a leakage phenomenon of stray light from the optical input side to the optical output side.

The other aspect of the connecting method according to the present invention, connecting a plurality of optical function devices formed on the same substrate, is constituted such that the plurality of optical function devices are connected in parallel, so that light input/output directions of optical function devices adjacent to each other on the substrate are opposite to each other.

The other aspect of optical apparatus according to the present invention comprises a plurality of optical function devices formed on the same substrate, and a parallel connecting section that connects the plurality of optical function devices in parallel, so that light input/output directions of optical function devices adjacent to each other on the substrate are opposite to each other.

According to the connecting method and the optical apparatus as described above, since the propagation directions of lights input/output to/from the optical function devices adjacent to each other are opposite to each other, for the plurality of optical function devices connected in parallel, there is reduced the rate that a stray light generated on the optical input side of the adjacent optical function device is coupled to the light being propagated within the output side optical path of the own optical function device. Thereby, it becomes possible to suppress effectively a leakage phenomenon of stray light between optical function devices adjacent to each other.

Further objects, features and advantages of the present invention will become more apparent from the following description of preferred embodiments when read in conjunction with the accompanying drawings.

BRIEF EXPLANATION OF THE DRAWINGS

FIG. 13 is a conceptual diagram for explaining filter characteristics of an optical filter of rejection type, in which

FIG. 14 is a diagram for explaining the deviation of selected wavelengths inherent to the substrate on which three-staged AOTFs are integrated, in which

FIG. 18 is a diagram showing one example in which the optical function devices on the same substrate are cascade connected by a conventional connecting method, in which

DETAILED DESCRIPTION OF THE PREFERRED EMBODIMENTS

Embodiments of the present invention will be described based on the drawings.

Figure 1:
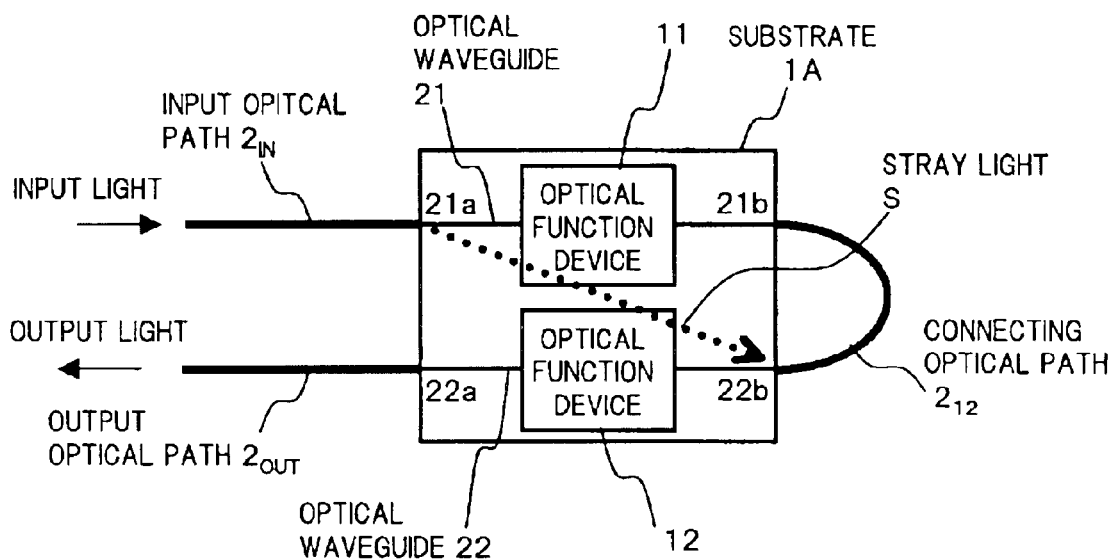
FIG. 1 is a block diagram showing a first embodiment of an optical apparatus according to the present invention.

FIG. 1 is a block diagram showing a first embodiment of an optical apparatus applied with a connecting method of optical function devices according to the present invention.

In FIG. 1, the optical apparatus in the first embodiment has a constitution in which, for two optical function devices 11 and 12 formed on two optical waveguides 21 and 22 within the same substrate 1A, respectively, an input optical path $2_{IN}$ is connected to one end 21a of the optical waveguide 21, while an output optical path $2_{OUT}$ is connected to one end 22a of the optical waveguide 22, positioned on the same face as the end face of the substrate 1A on which the one end 21a of the optical waveguide 21 is positioned, and the other end 21b of the optical waveguide 21 is connected to the other end 22b of the optical waveguide 22 by a connecting optical path $2_{12}$ so as to cascade connect the two optical function devices 11 and 12.

The substrate 1A is constituted such that two optical waveguides 21 and 22 substantially parallel with each other, and two optical function devices 11 and 12, are formed on a substrate material made of, for example, $SiO_2$ or $LiNbO_3$, by applying a required treatment on the substrate material. The optical function devices 11 and 12 may be known optical function devices, such as, optical switch, optical attenuator, optical filter and the like. Or, any of devices of optical waveguide type or non-optical waveguide type may be used. Further, the optical function devices 11 and 12 may be provided with same function or with different functions, respectively. Note, an example of specific constitution will be described later.

The input optical path $2_{IN}$, output optical path $2_{OUT}$, and connecting optical path $2_{12}$ are known optical paths, such as optical fiber or optical waveguide, respectively. An input light to the present optical apparatus is propagated through the input optical path $2_{IN}$, to be input to the one end 21a of the optical waveguide 21, and passes through the optical waveguide 21 to be given to the optical function device 11. Then, the light passed through the optical function device 11 is output from the other end 21b of the optical waveguide 21, and is propagated through the connecting optical path $2_{12}$ to be input to the other end 22b of the optical waveguide 22 on the substrate 1A, and further passes through the optical waveguide 22 to be given to the optical function device 12. The light passed through the optical function device 12 is output from the one end 22a of the optical waveguide 22, and is propagated through the output optical path $2_{OUT}$, to be output as an output light of the present optical apparatus.

In the optical apparatus having the above constitution, most of the input light given to the one end 21a of the optical waveguide 21 on the substrate 1A is propagated through the optical waveguide 21 to be sent to the optical function device 11, however, as shown by an arrow in dotted line in FIG. 1, a part of the input light is emitted into the substrate as a stray light S. This stray light S bypasses the optical function device 11, and is propagated towards the end face opposite to the optical input side of the substrate 1A. However, in the present optical apparatus, since the output optical path $2_{OUT}$ is connected to the one end 22a of the optical waveguide 22, positioned on the same face as the end face to which the input optical path $2_{IN}$ of the substrate 1A is connected, the stray light S is hardly to be coupled to the light being propagated near the one end 22a within the optical waveguide 22. Therefore, it becomes possible to suppress effectively a leakage phenomenon of the stray light S from the optical input side to the optical output side on the substrate 1A. Specifically, in the present optical apparatus, in a case where the optical function devices 11 and 12 are optical switches and the like, it becomes possible to achieve the improvement of extinction ratio. Further, in a case where the optical function devices 11 and 12 are optical filters and the like, it becomes possible to the improvement of suppression ratio between other channels or the improvement of extinction ratio at the time when the filters are used as notch filters.

In this way, according to the present optical apparatus, it becomes possible to sufficiently effect individual characteristics of the two optical function devices 11 and 12 on the substrate 1A. Thus, it becomes useful for miniaturization, low-cost of optical apparatus to make the optical devices integrated on the same substrate applicable to various optical transmission apparatuses.

Figure 2:
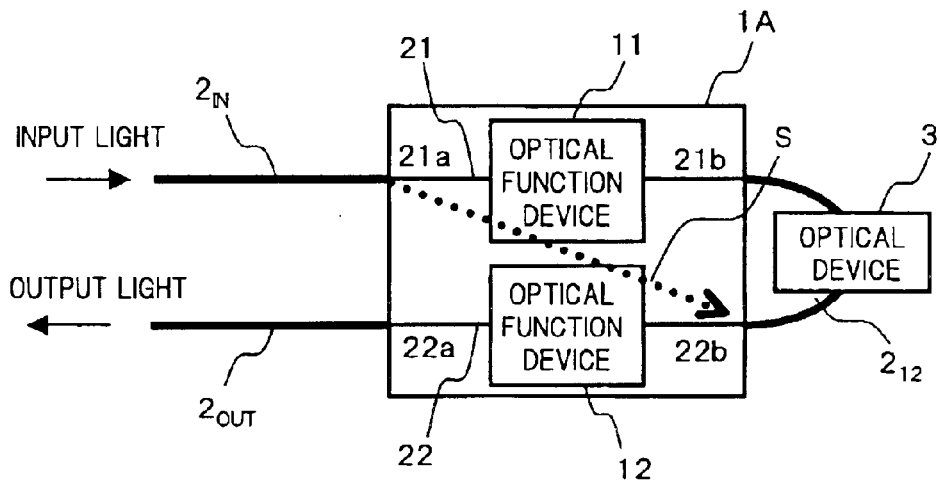
FIG. 2 is a block diagram showing another constitutional example of an optical apparatus in the first embodiment.

In the above first embodiment, there has been described the case where the other ends 21b and 22b of the optical waveguides 21 and 22 are directly connected to each other by the connecting optical path $2_{12}$. However, the present invention is not limited thereto, and the constitution may be such that another optical device 3 is disposed on the connecting optical path $2_{12}$, as shown in FIG. 2, for example. As a specific example of another optical device 3, an optical amplifier may be used. However, the optical device is not limited to the optical amplifier.

Next, there will be described a second embodiment of an optical apparatus according to the present invention.

Figure 3:
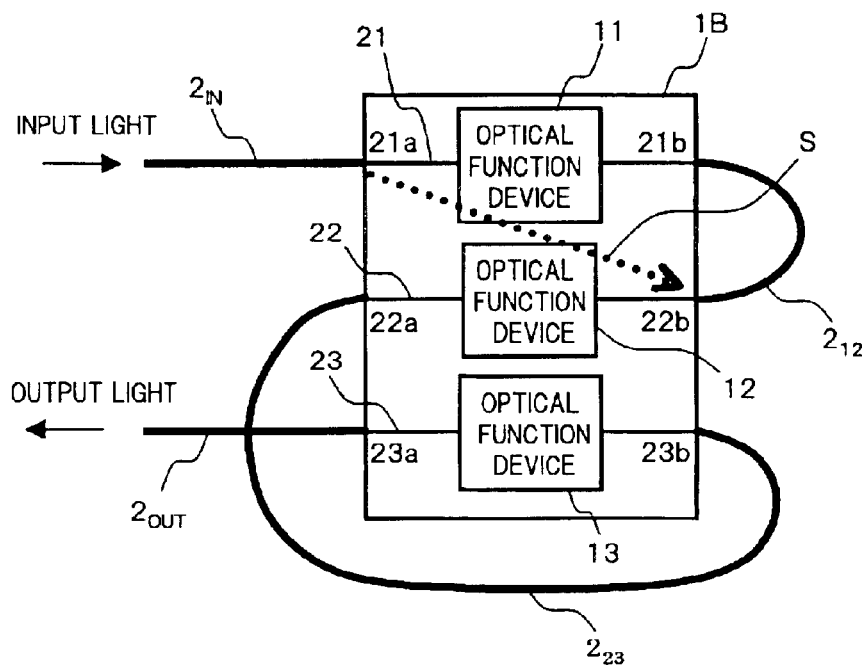
FIG. 3 is a block diagram showing a second embodiment of an optical apparatus according to the present invention.

FIG. 3 is a block diagram showing the second embodiment of an optical apparatus applied with a connecting method of optical function devices according to the present invention. Same components as those in the first embodiment are denoted by the same reference numerals and the descriptions thereof shall be omitted. Same rules shall be applied to the other embodiments.

In FIG. 3, the optical apparatus of the second embodiment corresponds to a case where three optical function devices integrated on the same substrate are cascade connected. Specifically, for three optical function devices 11, 12 and 13 that are formed on three optical waveguides 21, 22 and 23 within a substrate 1B, respectively, the input optical path $2_{IN}$ is connected to the one end 21a of the optical waveguide 21, while the output optical path $2_{OUT}$ is connected to one end 23a of the optical waveguide 23, positioned on the same face as the end face of the substrate 1B on which the one end 21a of the optical waveguide 21 is positioned. Further, the one end 22a of the optical waveguide 22 is connected to the other end 23b of the optical waveguide 23 by a connecting optical path $2_{23}$, and the other end 21b of the optical waveguide 21 is connected to the other end 22b of the optical waveguide 22 by the connecting optical path $2_{12}$. Thereby, the present optical apparatus has the constitution in which three optical function devices 11 to 13 are cascade connected.

The substrate 1B is constituted such that three optical waveguides 21 to 23 substantially parallel with one another, and three optical function devices 11 to 13, are formed on a required substrate material in the same manner as in the first embodiment. The optical function devices 11 to 13 are the same as the optical function devices described in the first embodiment.

The input light to the present optical apparatus is propagated through the input optical path $2_{IN}$, to be input to the one end 21a of the optical waveguide 21, and passes through the optical waveguide 21 to be given to the optical function device 11. The light passed through the optical function device 11 is output from the other end 21b of the optical waveguide 21, and is propagated through the connecting optical path $2_{12}$ to be input to the other end 22b of the optical waveguide 22 on the substrate 1B, and further passes through the optical waveguide 22 to be given to the optical function device 12. The light passed through the optical function device 12 is output from the one end 22a of the optical waveguide 22, and is propagated through the connecting optical path $2_{23}$ to be input to the other end 23b of the optical waveguide 23 on the substrate 1B, and further passes through the optical waveguide 23 to be given to the optical function device 13. The light passed through the optical function device 13 is output from the one end 23a of the optical waveguide 23, and is propagated through the output optical path $2_{OUT}$, to be output as an output light of the present optical apparatus.

In the optical apparatus having the above constitution, as in the first embodiment, since the output optical path $2_{OUT}$ is connected to the one end 23a of the optical waveguide 23, positioned on the same face as the end face to which the input optical path $2_{IN}$ of the substrate 1B is connected, the stray light S from the optical input side shown by a dotted line in FIG. 3 is hardly to be coupled to the light being propagated near the one end 23a within the optical waveguide 23. Therefore, it becomes possible to suppress effectively a leakage phenomenon of the stray light S from the optical input side to the optical output side on the substrate 1B, so that the individual characteristics of three optical function devices 11 to 13 on the substrate 1B can sufficiently be effected.

In the above first or second embodiment, there has been described the case where two or three optical function devices on the same substrate are cascade connected. However, the connecting method according to the present invention can also be applied to a case where four or more optical function devices on the same substrate are cascade connected.

Next, there will be described a third embodiment of an optical apparatus according to the present invention.

Figure 4:
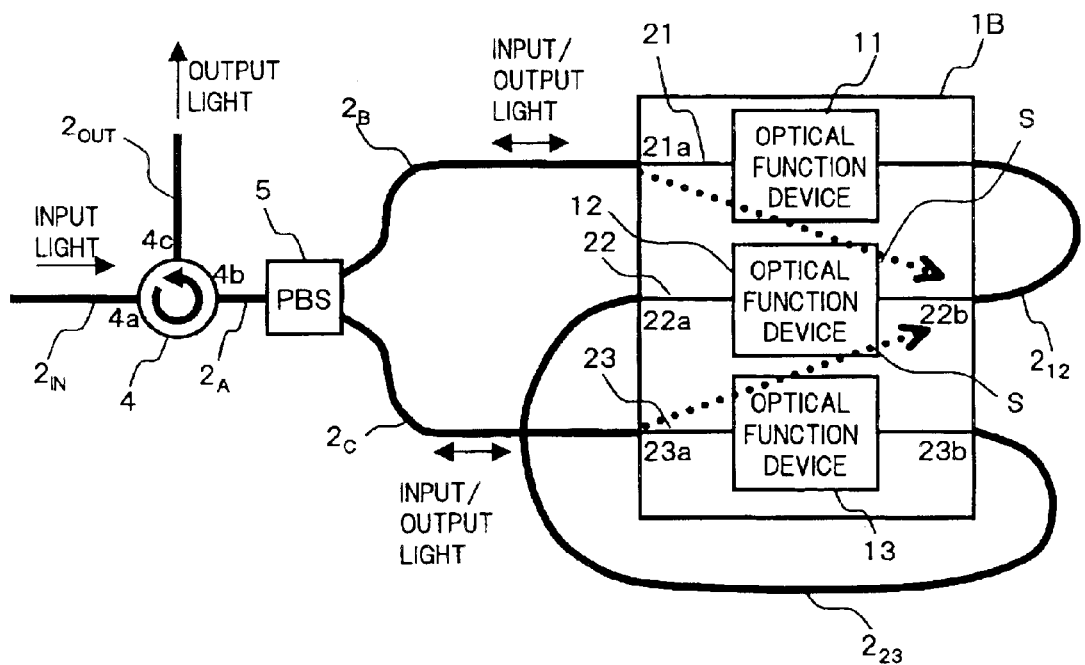
FIG. 4 is a diagram showing a third embodiment of an optical apparatus according to the present invention.

FIG. 4 is a block diagram showing the third embodiment of an optical apparatus applied with a connecting method of optical function devices according to the present invention.

In FIG. 4, the optical apparatus of the third embodiment corresponds to, for example, a case where three optical function devices integrated on the same substrate are cascade connected in a loop. In particular, herein, there is shown a constitution suitable for a case where at least one of the optical function devices has the polarization dependence. Specifically, optical input and output portions of the substrate 1B that has the same constitution as in the second embodiment are connected to the input optical path $2_{IN}$ and the output optical path $2_{OUT}$ by using an optical circulator 4, a polarization beam splitter (PBS) 5 and connecting optical paths $2_A$, $2_B$, $2_C$, so that three optical function devices 11 to 13 are cascade connected in a loop.

The optical circulator 4 is a typical optical component that includes at least three ports 4a, 4b and 4c, and transmits the light only in a direction from the port 4a to port 4b, from the port 4b to port 4c, and from the port 4c to port 4a. This optical circulator 4 is connected with the input optical path $2_{IN}$, the connecting optical path $2_A$ to be connected to a PBS 5, and the output optical path $2_{OUT}$, to the port 4a, port 4b, and port 4c, respectively.

The PBS 5 splits an input light sent from the port 4b of the optical circulator 4 via the connecting optical path $2_A$ into two polarization lights with polarization planes thereof being orthogonal to each other, to output one of the two polarization lights to one end of the connecting optical path $2_B$, while outputting the other polarization light to one end of the connecting optical path $2_C$. The other end of the connecting optical path $2_B$ is connected to the one end 21a of the optical waveguide 21 on the substrate 1B, and the other end of the connecting optical path $2_C$ is connected to the one end 23a of the optical waveguide 23 on the substrate 1B. Further, the PBS 5 multiplexes two polarization lights with the polarization planes being crossing each other sent from the substrate 1B via the connecting optical paths $2_A$ and $2_B$, to output the multiplexed polarization light to the connecting optical path $2_A$.

Note, the constitution that the one end 22a of the optical waveguide 22 on the substrate 1B is connected to the other end 23b of the optical waveguide 23 via the connecting optical path $2_{23}$, and the other end 21b of the optical waveguide 21 is connected to the other end 22b of the optical waveguide 22 via the connecting optical path $2_{12}$, is same as for the second embodiment.

In the optical apparatus having the above constitution, the input light being propagated through the input optical path $2_{IN}$ is sent to the PBS 5 via the optical circulator 4 and the connecting optical path $2_A$, and is split into two polarization lights crossing each other to be output to the connecting optical paths $2_B$ and $2_C$, respectively.

One polarization light output to the connecting optical path $2_B$ from the PBS 5 is input to the one end 21a of the optical waveguide 21 on the substrate 1B, and passes through the optical waveguide 21 to be given to the optical function device 11, and then passes through the connecting optical path $2_{12}$ and the optical waveguide 22 to be given to the optical function device 12, and further, passes through the connecting optical path $2_{23}$ and the optical waveguide 23 to be given to the optical function device 13. Then, the polarization light passed through the optical function device 13 is output to the connecting optical path $2_C$ from the one end 23a of the optical waveguide 23, to be returned the PBS 5.

Further, the other polarization light output to the connecting optical path $2_C$ from the PBS 5 passes through the respective optical function devices on the substrate 1B in a direction opposite to the direction of the one polarization light. That is, the other polarization light is input to the one end 23a of the optical waveguide 23 on the substrate 1B, and passes through the optical waveguide 23 to be given to the optical function device 13, and then passes through the connecting optical path $2_{23}$ and the optical waveguide 22 to be given to the optical function device 12, and further, passes through the connecting optical path $2_{12}$ and the optical waveguide 21 to be given to the optical function device 11. Then, the polarization light passed through the optical function device 11 is output to the connecting optical path $2_B$ from the one end 21a of the optical waveguide 21, to be returned the PBS 5.

As described above, when the respective polarization lights split by the PBS 5 are propagated in bi-directions through three optical function devices cascade connected on the substrate 1B, the stray lights S generated in the one ends 21a and 23a of the optical waveguides 21 and 23 as exemplarily shown by arrows in dotted lines in FIG. 4, are propagated towards the end face opposite to the optical input side of the substrate 1B. However, also in the present optical apparatus, as in the second embodiment, since the respective connecting optical paths $2_B$ and $2_C$ are connected to the one ends 21a and 23a of the optical waveguides 21 and 23, positioned on the same end face of the substrate 1B, the respective stray lights S are hardly to be coupled to the polarization lights being propagated near the one ends 21a and 23a within the optical waveguides 21 and 23.

Then, the respective polarization lights returned to the PBS 5 via the connecting optical paths $2_B$ and $2_C$ are multiplexed by the PBS, and then sent to the optical circulator 4 via the connecting optical path $2_A$, to be output to the output optical path $2_{OUT}$ after passing through from the port 4b to the port 4c.

As described above, also in the optical apparatus of the third embodiment in which three optical function devices are cascade connected, it is possible to suppress a leakage phenomenon of the stray lights S being propagated within the substrate 1B, to the optical output side, so that individual characteristics of three optical function devices 11 to 13 on the substrate 1B can be sufficiently effected.

Note, in the third embodiment, three optical function devices on the same substrate are cascade connected in a loop by applying the connecting method according to the present invention. However, it is also possible to cascade connect in a loop two optical devices, or four or more optical devices on the same substrate by applying the connecting method according to the present invention. Moreover, there has been described the case where the optical function device has the polarization dependence. However, even when the optical function device does not have the polarization dependence, surely it is possible to perform the cascade loop connection by applying the connecting method of the present invention.

Next, there will be described a fourth embodiment of an optical apparatus according to the present invention.

Figure 5:
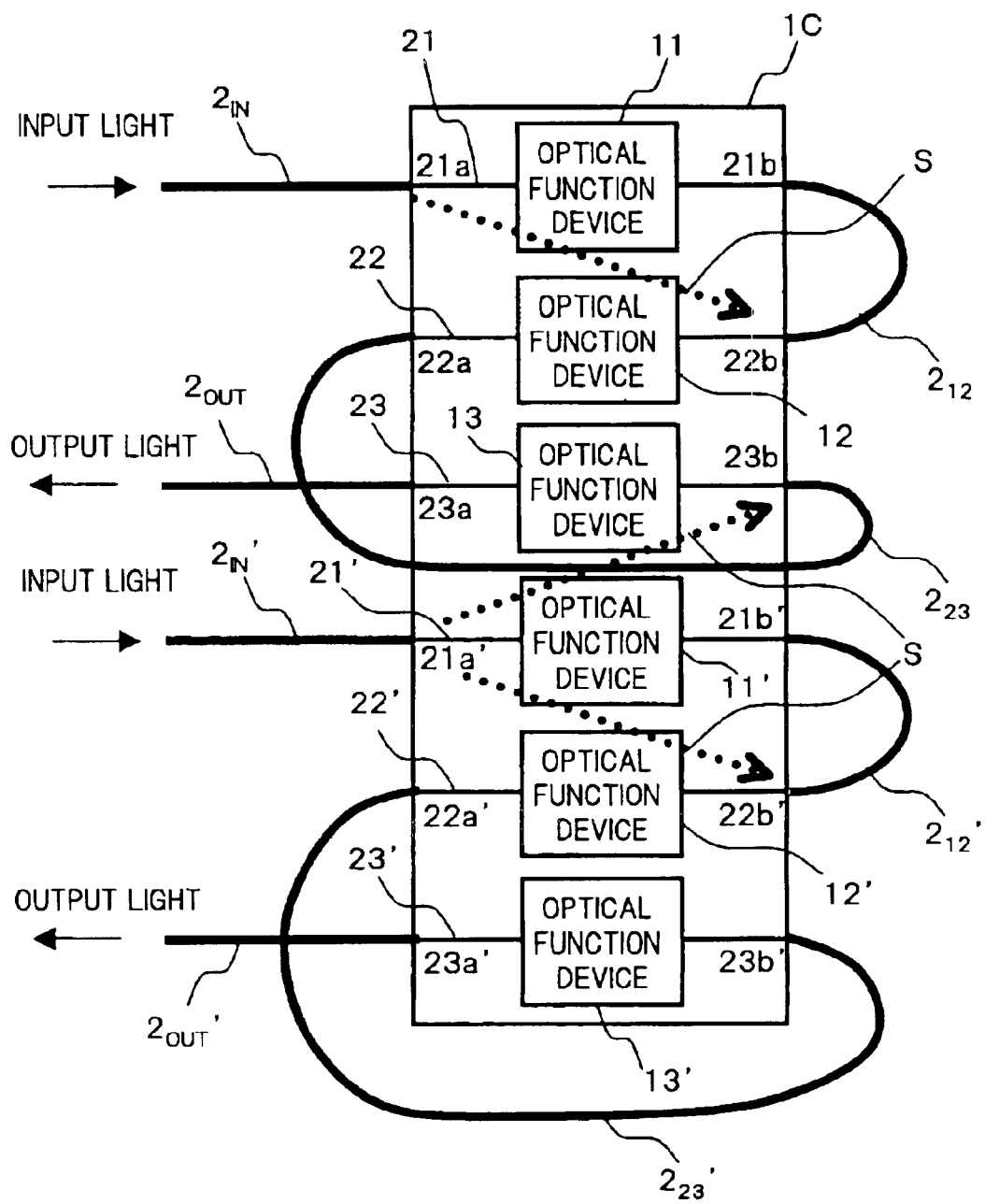
FIG. 5 is a block diagram showing a fourth embodiment of an optical apparatus according to the present invention.

FIG. 5 is a block diagram showing the fourth embodiment of an optical apparatus applied with a connecting method of optical function devices according to the present invention.

In FIG. 5, the optical apparatus of the fourth embodiment is an application example for the optical apparatus of the second embodiment, in which a plurality of (herein, two) three-staged cascade connection configuration. Specifically, for six optical function devices 11 to 13 and 11' to 13' formed on six optical waveguides 21 to 23 and 21' to 23' within the same substrate 1C, respectively, input optical paths $2_{IN}$ and $2_{IN'}$ are connected to one ends 21a and 21a' of the optical waveguides 21 and 21', respectively, and output optical paths $2_{OUT}$ and $2_{OUT'}$ are connected to one ends 23a and 23a' of the optical waveguides 23 and 23', positioned on the face same as the end face of the substrate 1C on which the one ends 21a and 21a' of the optical waveguides 21 and 21' are positioned. Further, the one ends 22a and 22a' of the optical waveguides 22 and 22' are connected to the other ends 23b and 23b' of the optical waveguides 23 and 23' by connecting optical paths $2_{23}$ and $2_{23}'$, and the other ends 21b and 21b' of the optical waveguides 21 and 21' are connected to the other ends 22b and 22b' of the optical waveguides 22 and 22' by connecting optical paths $2_{12}$ and $2_{12}'$. Thereby, the present optical apparatus has the constitution in which six optical function devices 11 to 13 and 11' to 13' are cascade connected in two groups.

In the optical apparatus having the above constitution, for the three-staged structure obtained by cascade connecting the optical function devices 11 to 13 and the three-staged structure obtained by cascade connecting the optical function devices 11' to 13', as in the second embodiment, the input lights from the input optical paths pass through the three-staged optical function devices sequentially, to be sent to the optical output optical paths as output lights. Since the input optical paths $2_{IN}$ and $2_{IN}'$ and output optical paths $2_{OUT}$ and $2_{OUT}'$ of the respective three staged structures are connected to one ends of the optical waveguides 21 and 23, and 21' and 23', positioned on the same end face of the substrate 1C, the respective stray lights S from the respective optical input sides exemplarily shown by arrows in dotted lines of FIG. 4 are hardly to be coupled to the lights being propagated near the one ends 23a and 23a' within the optical waveguides 23 and 23'. Thereby, also in the optical apparatus having two groups of cascade connection configuration on the same substrate 1C, it is possible to suppress effectively a leakage of the stray lights S.

In the above fourth embodiments, there has been described the case where two groups of three-stages cascade connection configuration are provided on the same substrate. However, the number of groups and the number of stages of the cascade connection configuration on the same substrate in the present invention are not limited to the above example. Further, the cascade loop configuration as shown in the third embodiment can also be applied as in the same manner as described above.

Next, there will be described a fifth embodiment of an optical apparatus according to the present invention.

Figure 6:
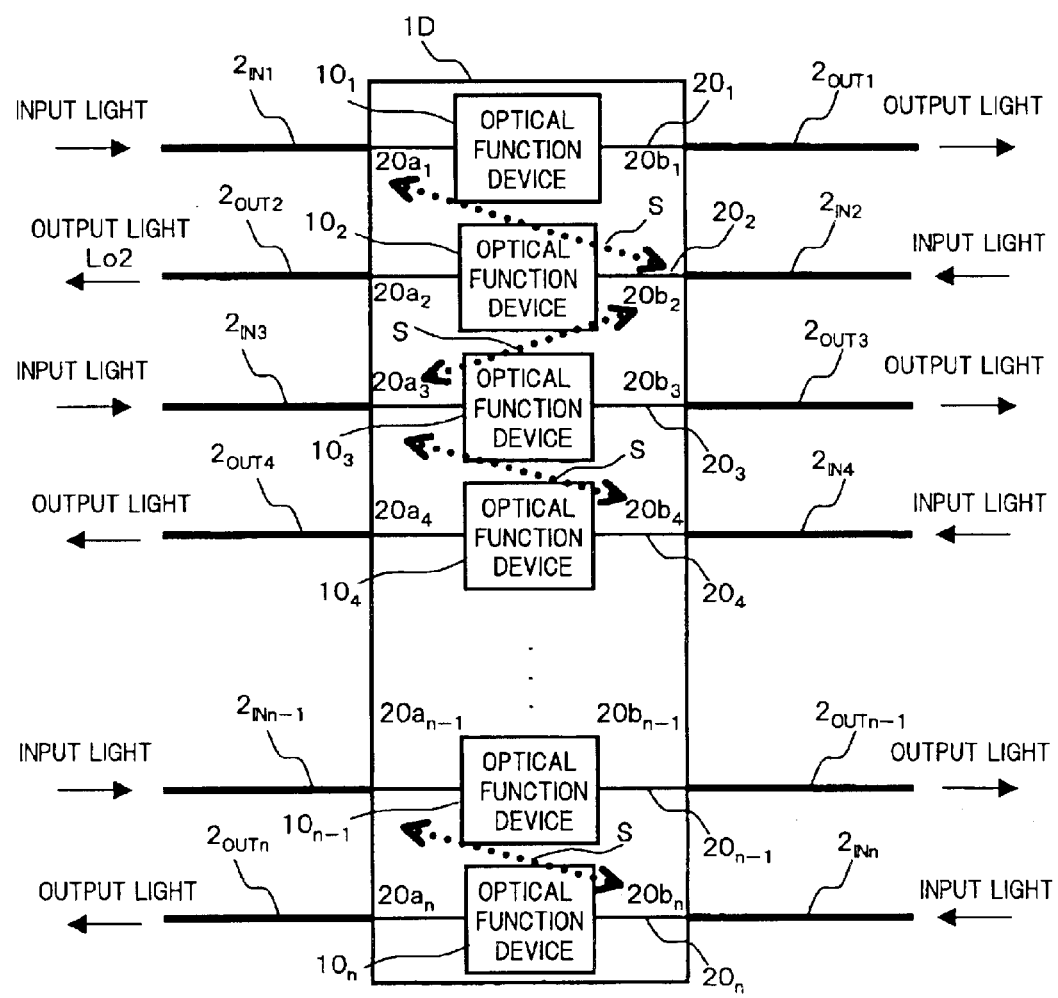
FIG. 6 is a block diagram showing a fifth embodiment of an optical apparatus according to the present invention.

FIG. 6 is a block diagram showing the fifth embodiment of an optical apparatus applied with the connecting method of optical function devices according to the present invention.

In FIG. 6, the optical apparatus in the fifth embodiment corresponds to a case where optical function devices of n in number integrated on the same substrate are individually used in parallel. Specifically, for optical function devices $10_1$ to $10_n$ of n in number formed on substantially parallel optical waveguides $20_1$ to $20_n$ of n in number within the same substrate 1D, the optical waveguides $20_1$ to $20_n$ are connected to input optical paths $2_{IN1}$ to $2_{INn}$, and to output optical paths $2_{OUT1}$ to $2_{OUTn}$, so that input/output directions of lights to/from optical function devices adjacent to each other are opposite to each other.

Herein, if one end $20a_1$, of the optical waveguide $20_1$, is connected to the input optical path $2_{IN1}$ and the other end $20b_1$ is connected to the output optical path $2_{OUT1}$, one end $20a_2$ of the optical waveguide $20_2$ adjacent to the optical waveguide $20_1$, is connected to the output optical path $2_{OUT2}$ and the other end $20b_2$ is connected to the input optical path $2_{IN2}$. Further, one end $20a_3$ of the optical waveguide $20_3$ adjacent to the optical waveguide $20_2$ is connected to the input optical path $2_{IN3}$ and the other end $20b_3$ is connected to the output optical path $2_{OUT3}$. In the same manner as the above, the connection is sequentially performed so that the input/output directions of lights to/from the respective optical waveguides $20_4$ to $20_n$ are opposite to each other. Thus, the input/output directions of lights to/from the optical function devices adjacent to each other are opposite to each other.

In this way, for example, most of the input light given to the one end $20a_1$ of the optical waveguide $20_1$ from the input optical path $2_{IN1}$ is propagated through the optical waveguide $20_1$ to be sent to the optical function device $10_1$, however, as shown by an arrow in dotted line in FIG. 6, a part of the input light is emitted into the substrate as a stray light S. This stray light S is propagated towards the end face opposite to the optical input side of the substrate 1D. However, since the adjacent optical waveguide $20_2$ is connected to the input optical path $2_{IN2}$ at the other end $20b_1$ and to the output optical path $2_{OUT2}$ at the one end $20a_2$, there is sufficiently reduced the rate that the stray light S from the one end $20a_1$ of the optical waveguide $20_1$, is coupled to the light being propagated near the one end $20a_2$ of the optical waveguide $20_2$, compared to the conventional connection configuration in which the light is input/output in the same direction to/from the adjacent optical function devices. Further, although the stray light S is generated by the input light given to the other end $20b_2$ of the waveguide $20_2$, there is sufficiently reduced the rate that the stray light S is coupled to the light being propagated near the one end $20b_1$, of the adjacent optical waveguide $20_1$.

The above connection relationships of input and output optical paths to the stray light S are established for all the optical function devices adjacent to one another on the substrate 1D. Therefore, according to the present optical apparatus, it becomes possible to suppress effectively a leakage phenomenon of the stray light S so as to sufficiently effect the individual characteristics of the optical function devices of n in number to be used in parallel.

Next, there will be a specific embodiment of an optical apparatus applied with a connecting method of optical function devices according to the present invention. In the following, the consideration is made, as an example, on a rejection type optical filter embodied the optical apparatus of the third embodiment as a basic constitution.

Figure 7:
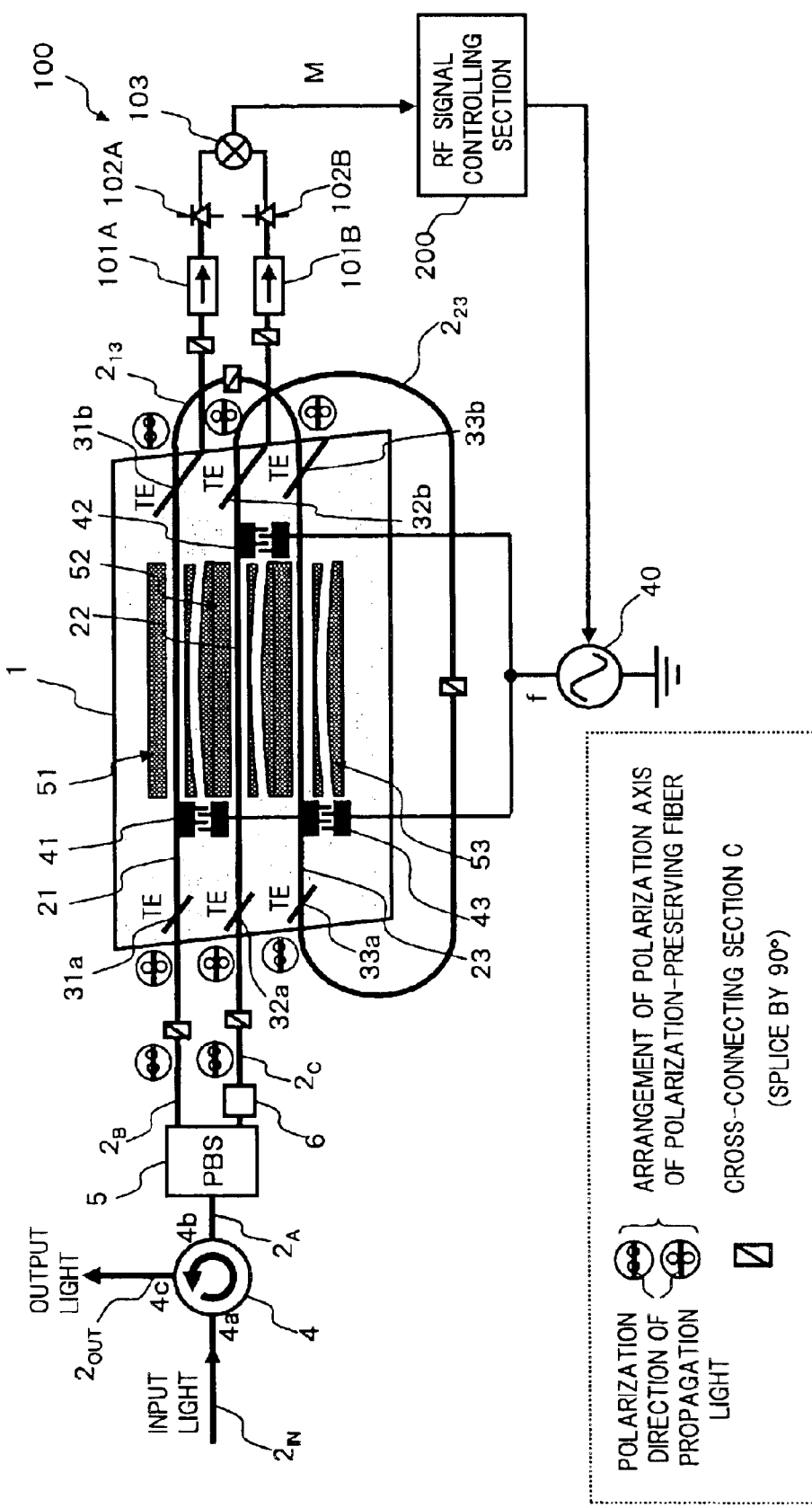
FIG. 7 is a plan view showing a constitution of rejection type optical filter as a specific example of an optical apparatus according to the present invention.

FIG. 7 is a plan view showing the constitution of the rejection type optical filter.

In the rejection type optical filter shown in FIG. 7, for example, acousto-optic tunable filters (AOTF) are adopted as three optical function devices 11 to 13 formed on the same substrate 1. Optical input and output portions of the substrate 1 are connected to the input optical path $2_{IN}$ and the output optical path $2_{OUT}$ by using the optical circulator 4, the polarization beam splitter (PBS) 5, a polarization rotating section 6 and the connecting optical paths $2_A$, $2_B$, $2_C$, so that the three AOTFs on the substrate 1 are cascade connected in a loop.

The substrate 1 is constituted such that three optical waveguides 21, 22 and 23 substantially parallel with one another are formed on a substrate material made of, for example, $LiNbO_3$. The respective optical waveguides 21 to 23 are provided with polarization beam splitters (PBS) 31a, 31b, 32a, 32b, 33a and 33b, respectively, at both end portions thereof. Also, the substrate 1 is formed with interdigital transducers (IDT) 41, 42 and 43, and SAW guides 51, 52 and 53, corresponding to the optical waveguides 21 to 23, respectively.

As the respective PBSs 31a, 31b, 32a, 32b, 33a and 33b, it is possible to use, for example, PBSs of crossing waveguide type and the like. Here, input and output ports of the PBSs positioned at the crossing sides of the crossing waveguides are connected to the optical waveguides, respectively, so that the respective PBSs are constituted to be of TE mode transmission type.

The respective IDTs 41 to 43 are applied commonly with a signal of required frequency f generated by an RF signal generating circuit 40, to generate surface acoustic waves (SAW), respectively, on the substrate 1. Note, as will be described later, positions of the respective IDTs 41 to 43 are preferably set such that relationships between the propagation directions of SAWs and the propagation directions of lights within the corresponding optical waveguides are those taking into account of influences of selected wavelength Doppler shift and the like.

The SAW guides 51 to 53 are those for propagating respective SAWs generated at the IDTs 41 to 43 through the optical waveguides 21 to 23, respectively. Here, a case is shown where, for example, SAW guides of directional coupling type formed in required shape by Ti diffusion are used, as the SAW guides 51 to 53.

In the AOTF using the SAW guides of directional coupling type, SAWs generated at the IDTs are directionally coupled by the SAW guides of required shape, so that SAWs most strongly interfere the light being propagated through the optical waveguide in the vicinity of the center of mode conversion area. Thus, it is possible to achieve the suppression of side lobe level in the filter characteristics of AOTF. Note, in the SAW guides shown in FIG. 7, curving shapes are adopted in order to directionally couple SAWs in accordance with a further desired function. In this way, it becomes possible to suppress further effectively the side lobe level.

Here, the case is shown where the AOTF using the SAW guides of directional coupling type is used. However, the present invention is not limited thereto, and it is possible to use AOTF and the like formed with SAW guides of thin film type on the optical waveguides. Further, for the AOTF using the SAW guides of thin film type, the arrangement may be such that the longitudinal direction of each SAW guide is inclined by a required amount to the axial direction of the optical waveguide so that the propagation axis of SAW and the optical axis cross each other at an inclined angle. By adopting such an arrangement, the intensity of surface acoustic wave sensed by the light is weighted in the longitudinal direction. Thus, it becomes possible to achieve the suppression of side lobe level.

The optical circulator 4 and the PBS 5 are the same as those used in the third embodiment. This optical circulator 4 is connected with the input optical path $2_{IN}$, the connecting optical path $2_A$ to be connected to a PBS 5, and the output optical path $2_{OUT}$, to the port 4a, port 4b, and port 4c, respectively.

The connection of the PBS 5 and the substrate 1 is such that the other end of the connecting optical path $2_B$, to which the one polarization light split by the PBS 5 is input to the one end thereof, is connected to the PBS 31a positioned on the optical waveguide 21 of the substrate 1. The other end of the connecting optical path $2_C$, to which the other polarization light split by the PBS 5 is input to the one end thereof, is connected to the PBS 32a positioned on the optical waveguide 22 of the substrate 1. Also, herein, a polarization rotating section 6 is inserted onto the connecting optical path $2_C$. The polarization rotating section 6 has a function for rotating the polarization plane of the other polarization light split by the PBS 5 by 90 degrees.

The PBS 31b positioned on the optical waveguide 21 of the substrate 1 is connected to the PBS 33b positioned on the optical waveguide 23 by the connecting optical path $2_{13}$. Further, the PBS 32b positioned on the optical waveguide 22 of the substrate 1 is connected to the PBS 33a positioned on the end portion of the optical waveguide 23 by the connecting optical path $2_{23}$. Thus, three AOTFs for main signal on the substrate 1 are cascade connected in a loop between the input optical path $2_{IN}$ and the output optical path $2_{OUT}$.

Figure 8:
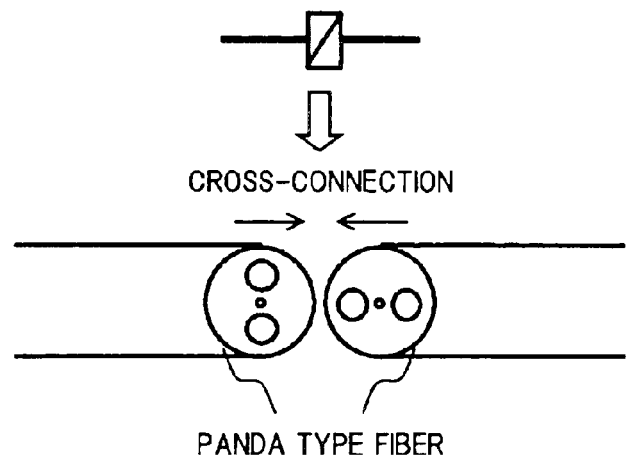
FIG. 8 is a diagram for explaining the cross-connection of connecting optical paths in the rejection type optical filter of FIG. 7.

The connecting optical paths $2_B$, $2_C$, $2_{13}$ and $2_{23}$ are polarization-preserving fibers, and here, for example, PANDA type fibers are used. However, the structure of polarization-preserving fiber is not limited to the PANDA type fiber, and it is possible to adopt a known structured fiber. Further, each of the connecting optical paths $2_B$, $2_C$, $2_{13}$ and $2_{23}$ is spliced by rotating the polarization axis substantially by 90 degrees (cross-connection) in the vicinity of a longitudinal direction thereof as shown in FIG. 8, and suppresses an influence due to the deviation of polarization axis of when connecting an optical device having polarization dependence (PDL) by the polarization-preserving fiber, as described later.

Figure 9:
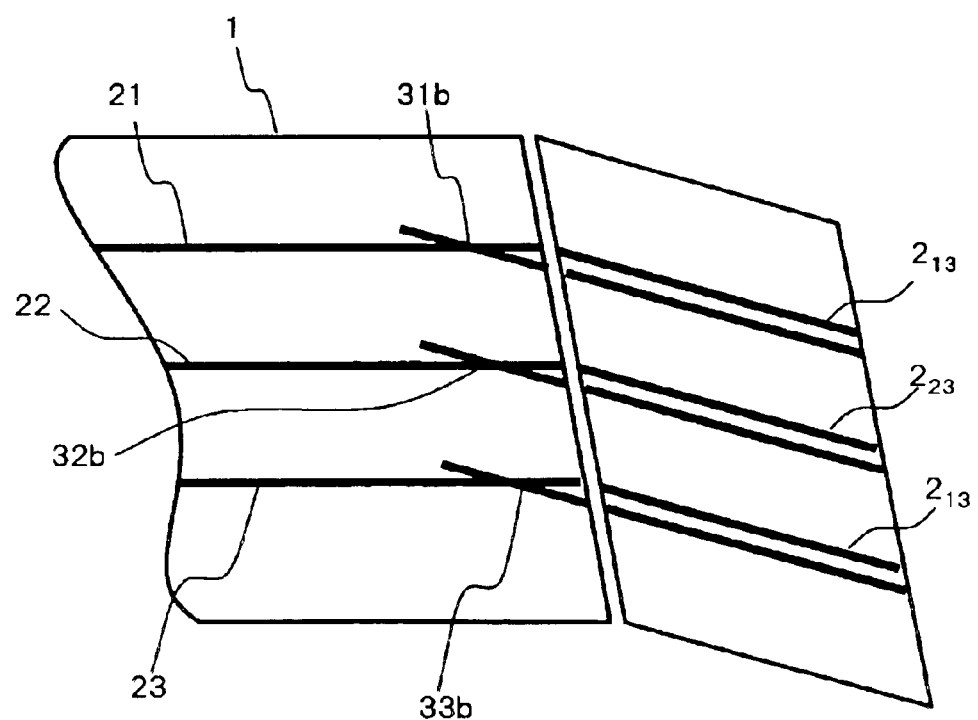
FIG. 9 is a diagram showing one example of the end face shape of a substrate in the rejection type optical filter of FIG. 7.
Figure 10:
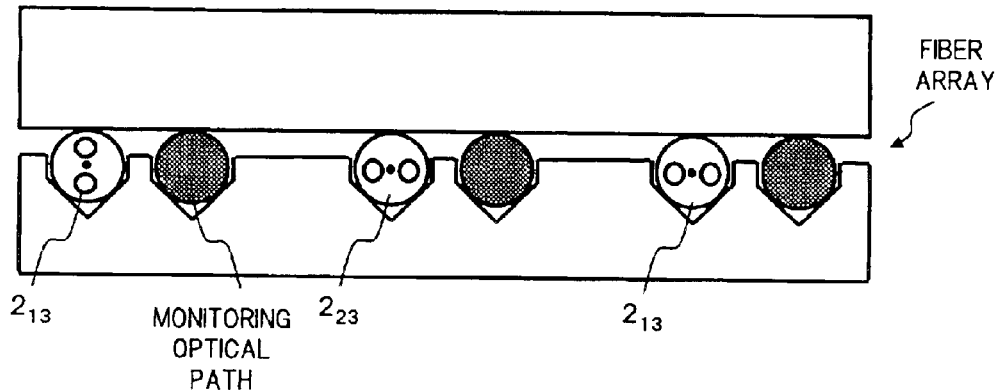
FIG. 10 is a diagram showing one example of fiber array structure connected to the substrate end face in the rejection type optical filter of FIG. 7.

It is preferable that two end faces opposite to each other of the substrate 1 to which the respective connecting optical paths $2_B$, $2_C$, $2_{13}$ and $2_{23}$ are connected, are inclined by required angles so as to reduce an influence of reflected light at the faces connected with the respective optical paths, for example, as shown in FIG. 9. Also, it is preferable that the optical fibers to be connected to each of the substrate end faces are structured in a fiber array, for example, as shown in FIG. 10. Note, the optical fibers provided in parallel to the respective connecting optical paths $2_{13}$ and $2_{23}$ in FIG. 10, are for extracting the dropped lights and the like to be blocked from passing through by the AOTFs at respective stages. An arrangement for the polarization axes of the polarization-preserving fibers within the fiber array is desirable to be set, considering the symmetry with a fiber array connected to the substrate end face on the opposite side, so that the kinds of the both side fiber arrays are the same.

The substrate 1 is provided with a monitoring section 100 that monitors a dropped light, and an RF signal controlling section 200 that controls the operation of the RF signal generating circuit 40 based on the monitoring result.

The monitoring section 100 comprises an optical isolator 101A and a light receiver 102A for monitoring a dropped light from the lights sequentially passing in one direction through the respective AOTFs cascade loop connected to one another, an optical isolator 101B and a light receiver 102B for monitoring a dropped light from the lights sequentially passing in the other direction through the respective AOTFs cascade loop connected to one another, and a circuit 103 that adds up output signals photo-electrically converted by the light receivers 102A and 102B, to output a monitor signal M. Here, an input port of the optical isolator 101A is connected to a TM mode output port of the PBS 31b on the substrate 1, while an input port of the optical isolator 101B is connected to a TM mode output port of the PBS 32b on the substrate 1. As described later, it is desirable to set a position for monitoring the dropped signal for the light in each direction to an AOTF stage wherein the selected wavelength (dropped wavelength) is positioned at the center of blocking band, considering an influence of dithering to be given to the RF signal.

In the rejection type optical filter having the above mentioned constitution, as in the third embodiment, the input light propagated through the input optical path $2_{IN}$ is sent to the PBS 5 via the optical circulator 4 and the connecting optical path $2_A$, and split into two polarization lights orthogonal to each other, to be output to the connecting optical paths $2_B$ and $2_C$, respectively. The polarization light output to the connecting optical path $2_C$ is rotated with polarization plane thereof by 90 degrees by the polarization rotating section 6, to be aligned with the polarization direction of the polarization light output to the connecting optical path $2_B$. Then, the respective polarization lights propagated through the connecting optical paths $2_B$ and $2_C$ are given to the PBSs 31a and 32a on the substrate 1, respectively, as the TE mode lights. Note, in FIG. 7, the polarization directions of propagated lights are indicated together with the cross section of arrangement of polarization axes of the PANDA type fibers, so that the polarization directions of propagated lights at the respective portions on the optical paths cascade loop connected can be clearly understood.

The TE mode light given to the PBS 31a passes therethrough and is propagated through the optical waveguide 21 toward the PBS 31b. At this time, SAW generated as a result that the RF signal of frequency f from the RF signal generating circuit 40 is applied to the IDT 41, is guided along the optical waveguide 21 by the SAW guide 51, to be propagated in the same direction (forward direction) as the propagated light within the optical waveguide 21. Due to the acousto-optic effect by this SAW, only the light of wavelength corresponding to the frequency of SAW (selected wavelength) out of the TE mode light being propagated within the optical waveguide 21, is mode converted into a TM mode light. Then, the lights of respective modes reach the PBS 31b, the TE mode light of wavelengths different from the selected wavelength (non-selected wavelengths), that has not been mode converted, passes through the PBS 31b to be output to the connecting optical path $2_{13}$, while the mode converted TM mode light of selected wavelength is branched by the PBS 31b as a dropped light, to be sent to the optical isolator 101A of the first monitoring section 100.

The TE mode light output to the connecting optical path $2_{13}$ passes through the PANDA type fiber that is spliced by 90 degrees in the vicinity of the center in the longitudinal direction, to be sent to the PBS 33b on the optical waveguide 23. At this time, a periodic wavelength dependence loss or polarization mode dispersion (PMD) due to inter-polarization-mode interference caused in the PANDA type fiber, and a polarization dependence loss (PDL) caused in the PBS on the substrate 1 and the like are offset in front of and behind the 90 degree splice point, to be suppressed.

Here, there will be described the inter-polarization-mode interference caused within the optical paths of polarization-preserving type.

As in the above rejection type optical filter, in a case where a device such as PBS having PDL is positioned between the optical function device and the polarization-preserving fiber, or a case where each optical device has PDL due to the connection between the optical devices by the polarization-preserving fiber, it is an ideal to perform the connection by completely coinciding the polarization axis (Fast axis, Slow axis) directions of the polarization-preserving fiber with the PBS direction or the PDL direction. However, in the actual connection of the polarization-preserving fiber with the optical devices, it is difficult to completely coincide the axis directions with each other and thus, certain axis deviation cannot be avoided.

Figure 11:
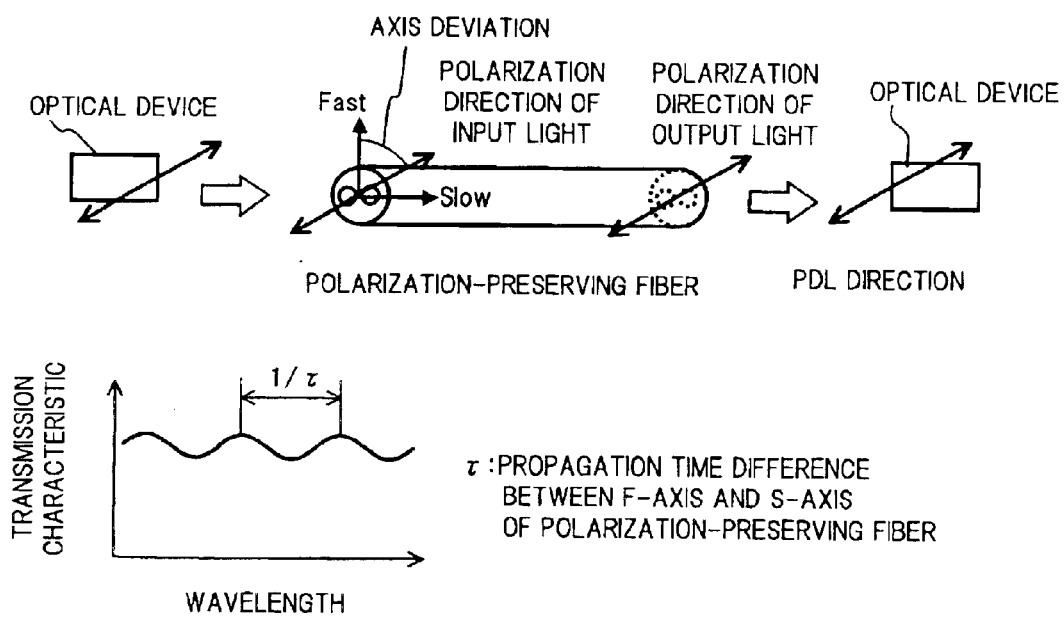
FIG. 11 is a diagram for explaining inter-polarization-mode interference of a polarization-preserving fiber.

If the axis deviation as mentioned above is caused, as shown in FIG. 11, the inter-polarization-mode interference of the polarization-preserving fiber is caused, resulted in the periodic wavelength dependence loss in the transmission characteristics of optical devices. The period of this periodic wavelength dependence loss becomes $1/\tau$, if a difference between the propagation times of Fast axis and Slow axis of the polarization-preserving fiber is $\tau$. Such a periodic wavelength dependence loss due to the inter-polarization-mode interference of the polarization-preserving fiber causes a change in level of transmission light in an optical filter of rejection type according to the wavelength, to lead characteristic deterioration.

Therefore, in the present optical filter, by splicing the PANDA type fiber by rotating the polarization axis thereof by 90 degrees in the vicinity of the center of the connecting optical path in the longitudinal direction, the respective directions of Fast axis and Slow axis are switched in front of and behind the splicing point, so that the influence by the above mentioned periodic wavelength dependence loss, PMD or PDL are offset.

The TE mode light sent to the PBS 33b on the substrate 1 passes therethrough and is propagated within the optical waveguide 23 toward the PBS 33a. At this time, SAW generated at the IDT 43 and guided by the SAW guide 53 is propagated in a reverse direction to the propagated light within the optical waveguide 23. Due to the acoust-optic effect by this SAW, only the light corresponding to the selected wavelength out of the TE mode light being propagated through the optical waveguide 23 is mode converted into a TM mode light. Then, when the lights of respective modes reach the PBS 33a, the TE mode light of non-selected wavelengths, that has not been mode converted, passes through the PBS 33a to be output to the connecting optical path 223, while the mode converted TM mode light of selected wavelength is branched by the PBS 33a.

The TE mode light output to the connecting optical path $2_{23}$ is sent to the PBS 32b on the optical waveguide 22 while the periodic wavelength dependence loss and the like thereof being suppressed by passing the PANDA type fiber that is spliced by 90 degrees, in the same manner as when passed through the connecting optical path $2_{13}$.

The TE mode light sent to the PBS 32b passes therethrough and is propagated within the optical waveguide 22 toward the PBS 32a. At this time, SAW generated at the IDT 42 and guided by the SAW guide 52 is propagated in a forward direction to the propagated light within the optical waveguide 22. Due to the acoust-optic effect by this SAW, only the light corresponding to the selected wavelength out of the TE mode light being propagated through the optical waveguide 22 is mode converted into a TM mode light. The TE mode light of non-selected wavelengths, that has not been mode converted, passes through the PBS 32a to be output to the connecting optical path $2_C$, while the mode converted TM mode light of selected wavelength is branched by the PBS 32a. The TE mode light output to the connecting optical path $2_C$ is rotated with the polarization plane thereof by 90 degrees by the polarization rotating section 6 on the connecting optical path $2_C$ and then returned to the PBS 5.

The respective selected wavelengths to be mode converted at the respective optical waveguides 21 to 23 are slightly different from one another, due to the selected wavelength Doppler shift to be described in the following, or inherent wavelength deviation caused by variations in manufacturing process of the substrate 1, even in a constitution where the RF signal is applied commonly to the IDTs 41 to 43.

Here, the selected wavelength Doppler shift will be described.

Figure 12:
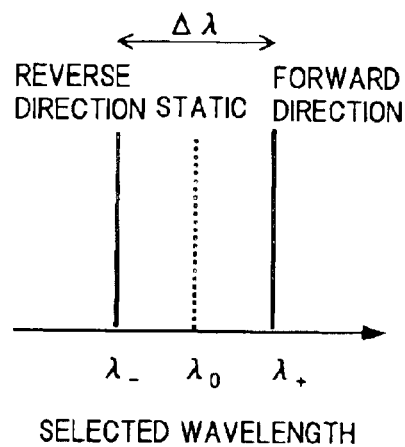
FIG. 12 is a diagram for explaining the selected wavelength Doppler shift in AOTF.

The selected wavelength Doppler shift is a phenomenon in which the wavelengths of the light to be polarization mode converted become different from one another due to the acousto-optic effect, depending on a relationship between the propagation direction of light within the optical waveguide and that of SAW transmitted along that optical waveguide. This phenomenon is caused by the same theory as that of typically known Doppler shift, and in the above case, it can be considered that the wavelength (frequency) of SAW viewed from the light is changed. Accordingly, for example, as shown in FIG. 12, if the propagation direction of light is the same forward direction as the propagation direction of SAW, the wavelength of SAW sensed by the light becomes longer. On the contrary, if the propagation direction of light is the reverse direction to the propagation direction of SAW, the wavelength of SAW sensed by the light becomes shorter. The selected wavelength λ in a case of influenced by such a Doppler shift, can be represented by the following equation (1);

$$\lambda = \frac{\lambda_0}{1 - v/c} \quad (1)$$

wherein $\lambda_0$ is the selected wavelength in a case where SAW is static, v is a speed of SAW, and c is an average speed of light in the optical waveguide.

Accordingly, a selected wavelength difference Δλ caused by whether the propagation directions of the light and SAW are forward directions or reverse directions can be represented by the following equation (2).

$$\Delta\lambda = 2 \cdot \lambda_0 \cdot \frac{v/c}{1 - (v/c)^2} \quad (2)$$

In the rejection type optical filter with three AOTFs cascade loop connected as shown in FIG. 7, the selected wavelengths in the AOTFs at respective stages are different from one another due to the inherent wavelength deviation caused by variations in manufacturing process of the substrate 1 in addition to the selected wavelength difference Δλ due to the above mentioned selected wavelength Doppler shift. The wavelength deviation caused by variations in manufacturing process, for example, is inherently caused in individual substrates due to manufacturing errors in width of the optical waveguides 21 to 23 at respective stages.

Figure 13A:
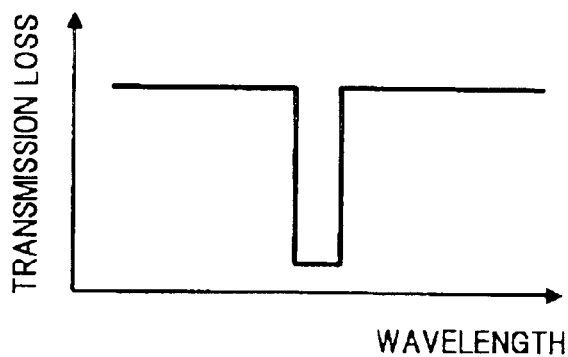
FIG. 13A shows ideal filter characteristics.
Figure 13B:
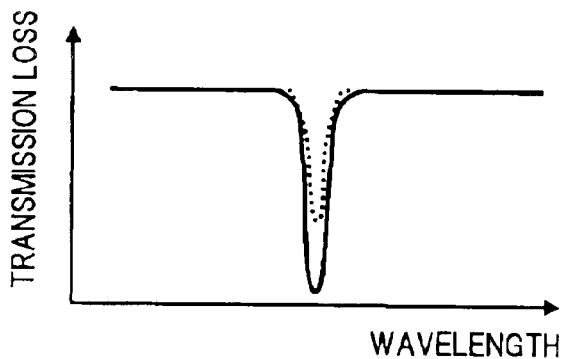
FIG. 13B shows filter characteristics of when the selected wavelengths are coincident with one another in a multi-staged structure.

For the wavelength characteristics of the rejection type optical filter, for example, as shown in the conceptual diagram of FIG. 13A, it is an ideal to have a filter characteristic that is changed in rectangular, namely, a change in transmissivity from the passing band to the blocking band is steep and also the blocking band has a required width. In the multi-staged structure of AOTFs, basically, the filter characteristic having an excellent extinction ratio can be obtained, as the number of stages is increased. At this time, if the selected wavelengths at the respective stages are all coincident, as shown in the conceptual diagram of FIG. 13B, since the transmissivity becomes minimum at one point, the width of blocking band becomes narrower. For the blocking band of the rejection type optical filter, a required width needs to be ensured, considering the conditions of, for example, the wavelength width of optical signal corresponding to the spectrum width of light source such as laser, errors in setting or controlling of AOTFs, or the unstable wavelength of light source. Therefore, according to the filter characteristics as shown in FIG. 13B, it becomes impossible to block the passing of optical signal of desired wavelength even in a case a slight variation is caused in the setting of the optical signal wavelength or the setting of filter.

Figure 13C:
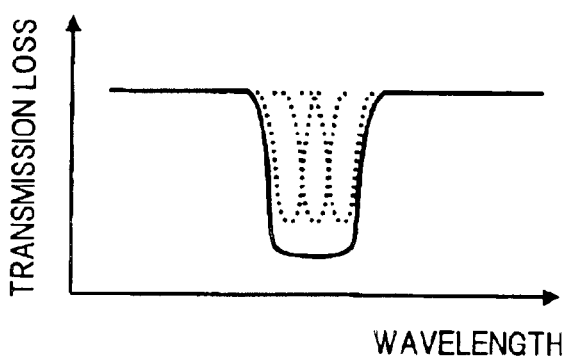
FIG. 13C shows filter characteristics of when the selected wavelengths are different from one another.

Therefore, in the rejection type optical filter shown in FIG. 7, the wavelength deviation inherent to the substrate caused by variations in manufacturing process is considered and also the selected wavelength difference Δλ due to the selected wavelength Doppler shift is utilized, to ensure a required width of blocking band by slightly deviating the selected wavelengths in the AOTFs at respective stages with one another as shown in FIG. 13C.

Figures 14A, 14B, 14C:
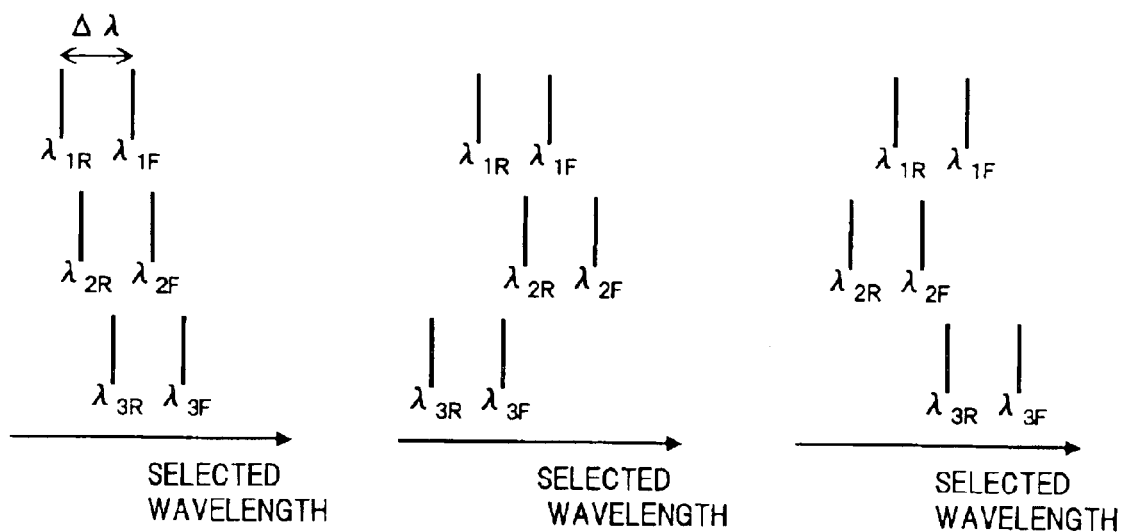
FIG. 14A to FIG. 14C are exemplary diagrams of wavelength deviation patterns.
Figure 14D:
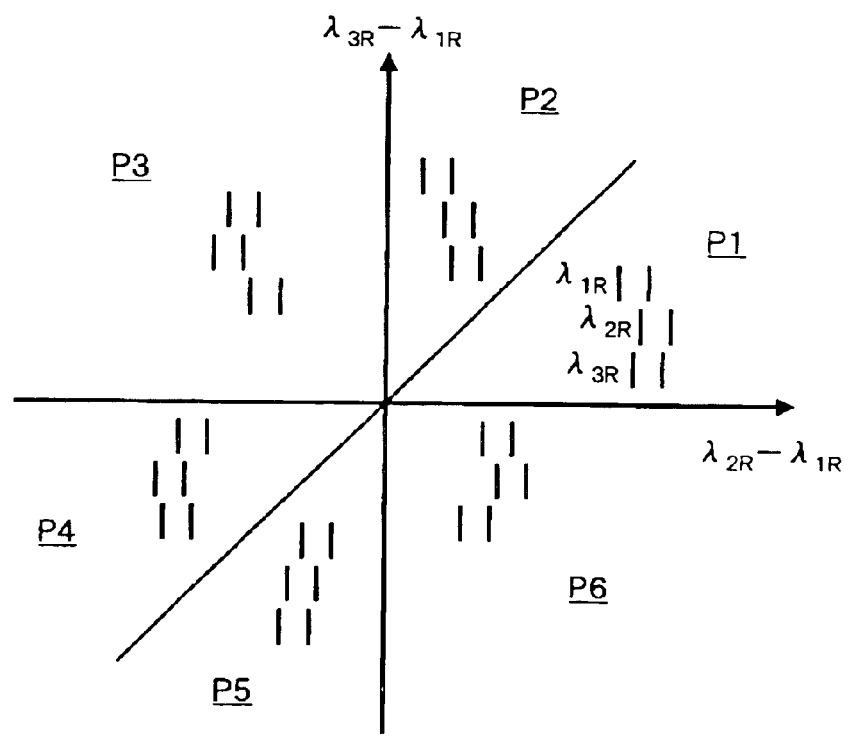
FIG. 14D is a diagram showing a typical wavelength deviation pattern.

Specifically, when the selected wavelengths corresponding to the respective optical waveguides 21, 22, 23 when SAWs of the same frequency f are given in the forward directions to the propagated lights are made $\lambda_{1F}$, $\lambda_{2F}$ and $\lambda_{3F}$, while the selected wavelengths corresponding to the respective optical waveguides 21, 22, 23 when SAWs of the same frequency f are given in the reverse directions to the propagated lights are made $\lambda_{1R}$, $\lambda_{2R}$ and $\lambda_{3R}$, there occurs various patterns in the wavelength deviation inherent to the substrate caused by variations in manufacturing process, as shown in FIG. 14A to FIG. 14C, for example. Such wavelength deviation patterns of the three staged AOTFs can be classified into six patterns P1 to P6 as shown in FIG. 14D when the values of $\lambda_{2R}-\lambda_{1R}$ are put on the horizontal axis and the values of $\lambda_{3R}-\lambda_{1R}$ are put on the transverse axis with the selected wavelength $\lambda_{1R}$ as the reference.

In order to realize the selected wavelengths that are slightly deviated among the respective stages as shown in FIG. 13C, it is required to determine optimum combinations of the wavelength deviation of the patterns P1 to P6, with the wavelength difference due to the selected wavelength Doppler shift. When determining the optimum combinations, it is desired to consider the condition that the connection relationship between the input and output for suppressing the influence of the stray light S as mentioned above, and the connection relationship in which such kinds of fiber arrays as explained in FIG. 10, are satisfied simultaneously. The optimum combinations satisfying all of these conditions can be determined corresponding to the respective patterns P1 to P6 in FIG. 13D, and the combination results are shown in FIG. 15.

Figure 15:
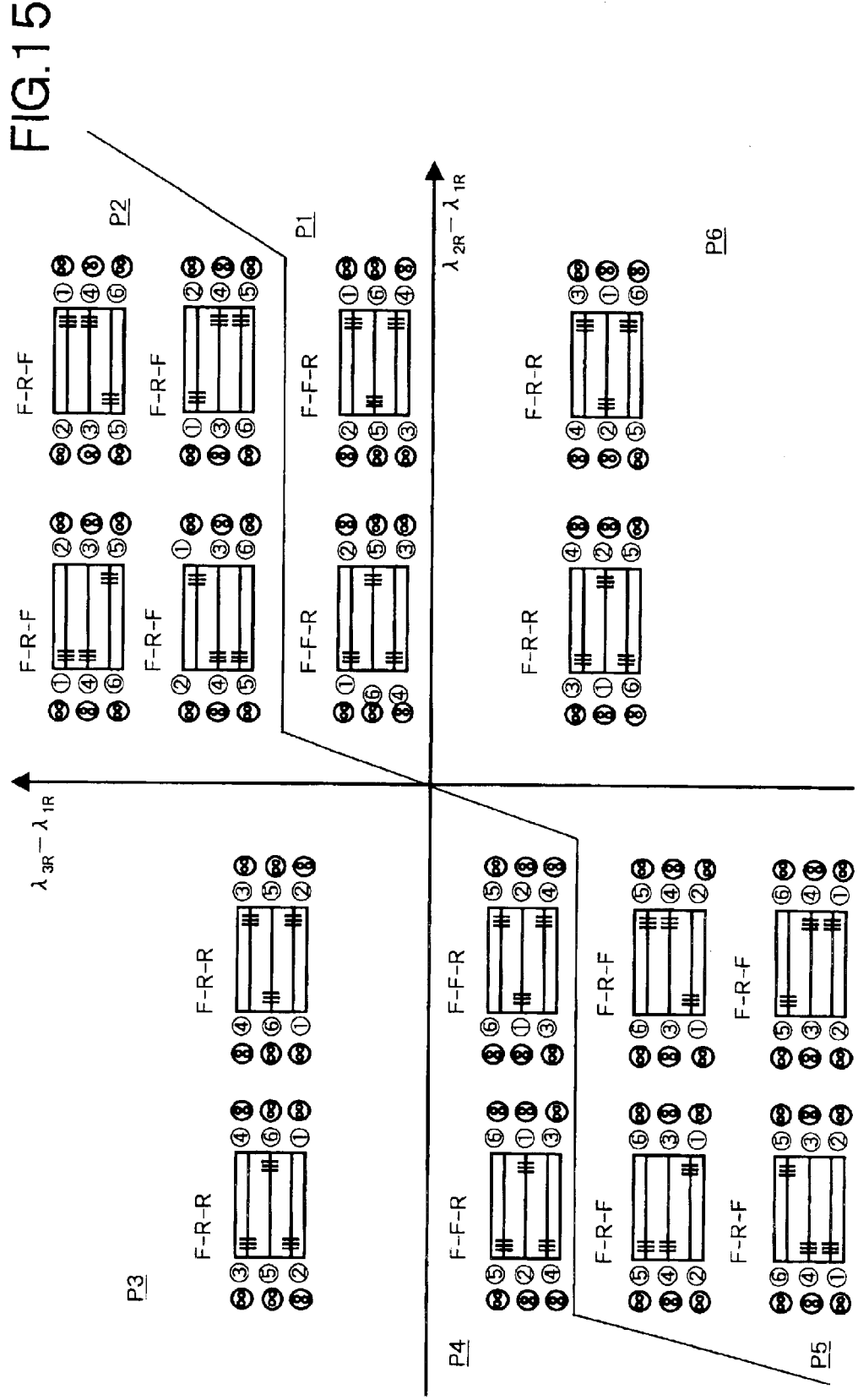
FIG. 15 is a schematic view arranging optimum connection relationships in view of an influence of selected wavelength Doppler shift and the like, according to the wavelength deviation patterns in FIG. 14.

In FIG. 15, the numerals to indicated at both ends of the substrate show the connecting orders of AOTFs at respective stages. Further, characters such as "F-F-R" (forward-forward-reverse) indicated at the upper part of the substrate show the propagation direction of SAW relative to the light being propagated through the optical waveguide positioned at the upper stage of the substrate in the figure, the propagation direction of SAW relative to the light being propagated through the optical waveguide positioned at the middle stage of the substrate, and the propagation direction of SAW relative to the light being propagated through the optical waveguide positioned at the lower stage of the substrate, in this sequence. Further, arrangements of respective polarization axes of when the respective PANDA type fibers connected to the both ends of the substrate are made fiber arrays of same kind, are shown on the right and left sides of the substrate.

The constitution of the rejection type optical filter shown in FIG. 7 specifically illustrates the connection relationship corresponding to the pattern P1 in FIG. 15. For the selected wavelength Doppler shift, the arrangement of the IDTs 41, 43 and 42 at the respective stages are set so that, to the light given via the connecting optical path $2_B$, the propagation direction of SAW in the AOTF of the first stage corresponding to the optical waveguide 21 is the forward direction, the propagation direction of SAW in the AOTF of the second stage corresponding to the optical waveguide 23 is the reverse direction, and the propagation direction of SAW in the AOTF of the third stage corresponding to the optical waveguide 22 is the forward direction. In the AOTFs at respective stages, since the RF signal of the same frequency is given to the IDTs, the wavelength difference due to the selected wavelength Doppler shift corresponding to the above equation (2) is caused between the selected wavelengths at the first and third stages, and the selected wavelength at the second stage. Thus, by combining the wavelength difference with the inherent wavelength deviation of the pattern P1, it becomes possible to realize the filter characteristic as shown in FIG. 13C.

Meanwhile, in the present rejection type optical filter 1, the TE mode light given from the PBS 5 to the PBS 32a of the substrate 1 via the connecting optical path $2_C$ and the polarization rotating section 6 passes through the AOTFs at respective stages sequentially, in reverse to the TE mode light given to the PBS 31a of the substrate 1 via the connecting optical path $2_B$, namely, passes sequentially through the optical waveguide 22, PBS 32a, connecting optical path $2_{23}$, PBS 33a, optical waveguide 23, PBS 33b, connecting optical path $2_{13}$, PBS 31b, optical waveguide 21 and PBS 31a, to be output to the connecting optical path $2_B$, and is returned to the PBS 5 under the polarization state just as is without polarization plane thereof rotated. In this reverse propagation of the polarization light, the mode converted TM mode light corresponding to the selected wavelength when being propagated through the optical waveguide 22, is branched by the PBS 32b as the dropped light, to be sent to the optical isolator 101B of the first monitoring section 100.

The respective polarization lights with polarization planes thereof being orthogonal to each other, returned to the PBS 5 via the connecting optical paths $2_B$ and $2_C$, are multiplexed by the PBS 5 and thereafter sent to the optical circulator 4 via the connecting optical path $2_A$, to be output to the output optical path $2_{OUT}$ after passing from the port 4b to the port 4c.

As mentioned above, when the polarization lights from the connecting optical paths $2_B$ and $2_C$ are propagated in bi-directions through the three staged AOTFs cascade loop connected on the substrate 1, the stray light generated from each of the PBSs 31a and 32a at the one end of each of the optical waveguides 21 and 22 is propagated toward the end face on the opposite side to the optical input side of the substrate 1. However, since the connecting optical paths $2_B$ and $2_c$ are connected to the PBSs 31a and 32a positioned on the same end face of the substrate 1, respectively, the stray light is hard to be coupled to the polarization lights being propagated near the PBSs 31a and 32a.

Moreover, in the present rejection type optical filter, the dropped lights branched by the PBSs 31b and 32b, pass through the optical isolators 101A and 101B of the monitoring section 100, to be converted into electrical signals at the light receivers 102A and 102B, respectively, and further are added up by the circuit 103 to be sent to the RF signal controlling section 200 as the monitor signal M. In the RF signal controlling section 200, the peak wavelengths of the dropped lights are detected based on the monitor signal M, and an amount of wavelength deviation to the previously set selected wavelength is obtained.

In the RF signal controlling section 200, as a method for detecting the peak wavelengths of the dropped lights based on the monitor signal M, for example, a method to add dithering to the frequency f of RF signal to be applied commonly to the IDTs 41 to 43 at the respective stages, is suitable. Specifically, in a case where the frequency f of RF signal is set to, for example, 170 MHz, 4 kHz or the like is set as the frequency Δf of the dithering, and the RF signal of which frequency fluctuates within a range of f±Δf is applied to each of the IDTs 41 to 43. Thus, the selected wavelengths to be mode converted in the AOTFs at the respective stages fluctuate corresponding to the frequency Δf of the dithering. Accordingly, the monitor signal M to be monitored by the monitoring section 100 includes frequency components corresponding to the dithering. Thus, it becomes possible to detect the peak wavelengths of the actually dropped lights by utilizing the detected frequency components.

Here, in a case where the dithering is added to the frequency of RF signal, it is desirable that, for the blocking band as shown in FIG. 13C, the dropped light is taken out from the AOTF stage of which selected wavelength is positioned at the center of the blocking band, to monitor the dropped light by the monitoring section 100. This is a useful setting for realizing the stable peak wavelength detection, by avoiding such a situation where, for example, if the dropped light from the AOTF stage of which selected wavelength is positioned at the end portion of the blocking band is monitored, the wavelength of the dropped light fluctuating by the dithering reaches the wavelength region where the transmissivity is steeply changed, so that the level of dropped light to be monitored by the monitoring section 100 is largely changed, thereby resulting in a possibility that the peak wavelength of dropped light cannot be accurately detected.

Figure 16:
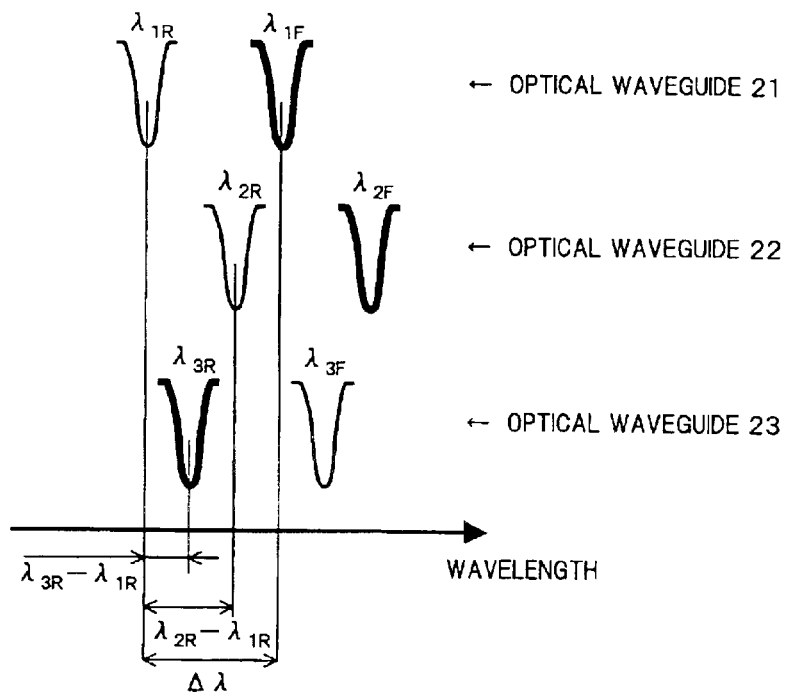
FIG. 16 is a diagram showing relationships among the selected wavelengths at respective stages set in the rejection type optical filter in FIG. 7.
Figure 17:
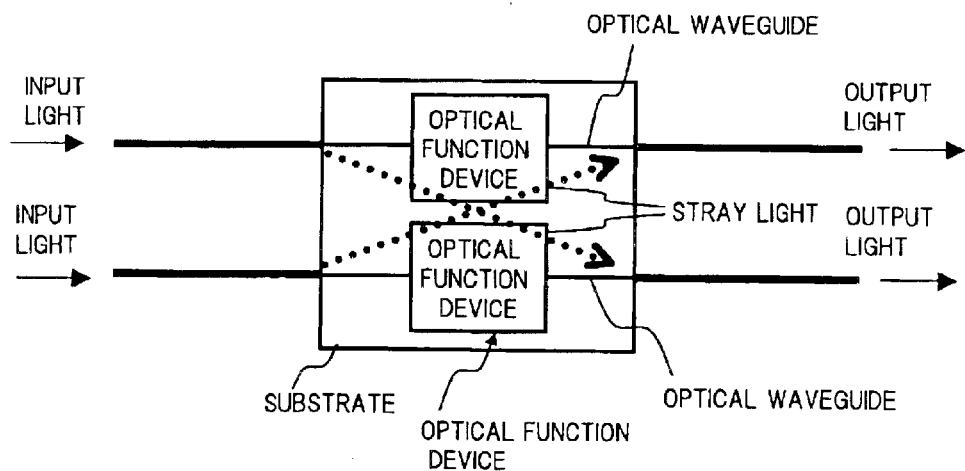
FIG. 17 is a diagram showing one example in which the optical function devices on the same substrate are connected in parallel by a conventional connecting method.
Figure 18A:
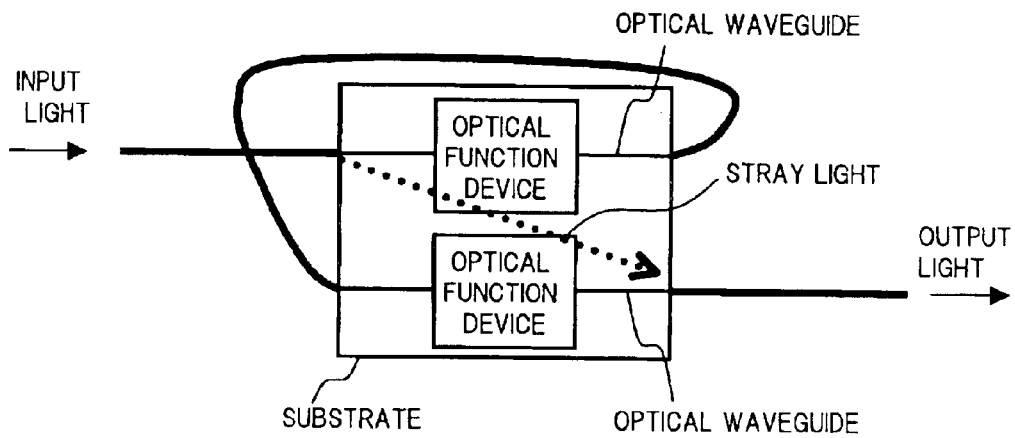
FIG. 18A shows a two-staged structure and FIG. 18B shows a three-staged structure.
Figure 18B:
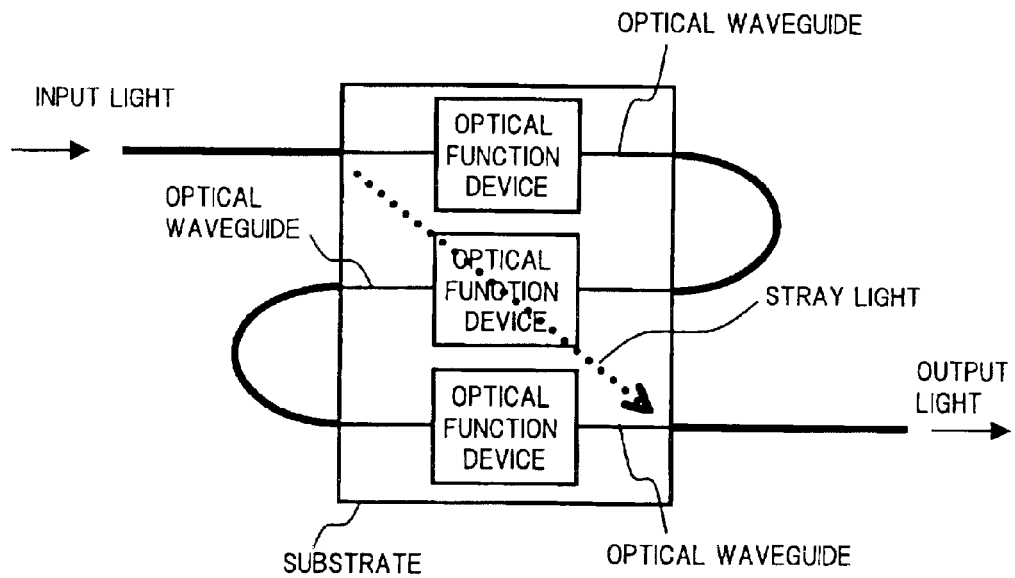
Figure 19:
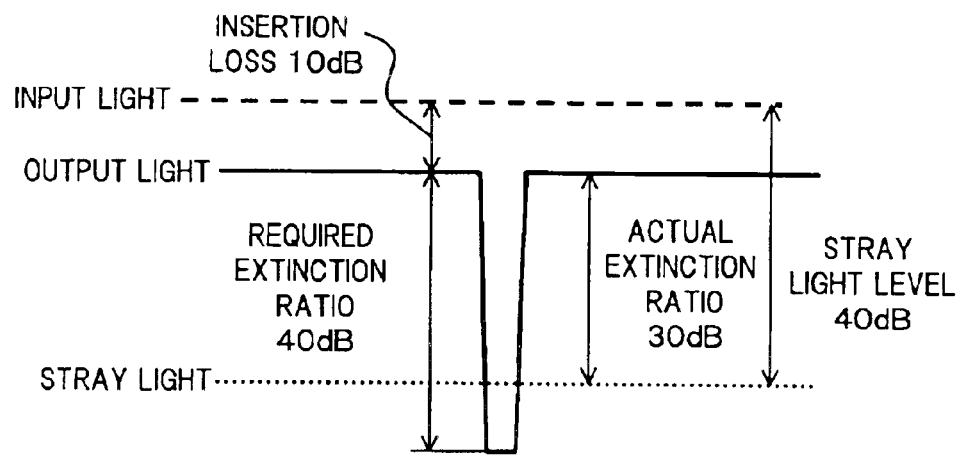
FIG. 19 is diagram for explaining an influence by a stray light in a conventional connecting method.

In the constitution of FIG. 7, the setting of the blocked wavelengths (selected wavelength) corresponding to the optical waveguides 21 to 23 on the substrate 1 is indicated in the relationship as shown in FIG. 16. Therefore, for the light given to the substrate 1 via the connecting optical path $2_B$ and propagated sequentially through the optical waveguides 21, 23 and 22, the monitoring is performed on the dropped light in the optical waveguide 21 corresponding to the wavelength $\lambda_{1F}$ positioned substantially at the center of the blocking band, depending on the relationship of blocking wavelength as shown by a bold line in the figure. Moreover, for the light given to the substrate 1 via the connecting optical path $2_C$ and propagated sequentially through the optical waveguides 22, 23 and 21, the monitoring is performed on the dropped light in the optical waveguide 22 corresponding to the wavelength $\lambda_{2R}$, depending on the relationship of blocking wavelength as shown by a thin line in the figure.

Based on the peak wavelengths of dropped lights detected in the above manner, the wavelength deviation amount to the previously set selected wavelength is obtained by the RF signal controlling section 200, and a controlling signal for correcting the frequency of RF signal is generated according to the wavelength deviation amount, to be output to the RF signal generating circuit 40. Then, in the RF signal generating circuit 40, in accordance with the controlling signal from the RF signal controlling section 200, the frequency f of RF signal is corrected, and the corrected RF signal is applied commonly to the IDTs 41 to 43 at the respective stages. Thus, even if the filter characteristic is changed due to a change in temperature, deterioration with time lapse or the like, it becomes possible to block reliably and stably a light desired wavelength from passing through, by tracking and controlling the frequency of RF signal.

As described above, according to the present rejection type optical filter, it is possible to suppress a leakage phenomenon of stray light being propagated within the substrate 1, to the optical output side, and to effect the individual characteristics of three AOTFs on the same substrate 1. Thus, it becomes possible to easily realize a rejection type optical filter having an excellent filter characteristic in which the extinction ratio exceeds 40 dB.

What is claimed is:

1. An optical apparatus comprising:

a substrate having a first end portion and an opposing second end portion;

a first optical function device, a second optical function device, and a third optical function device arranged in order on the substrate, the first optical function device having an input end and an output end respectively at the first end portion and the second end portion of the substrate, and the second optical function device and the third optical function device each having an input end input and an output end respectively at the second end portion and the first end portion of the substrate;

means for connecting the output end of the first optical function device at the second end portion of the substrate with the input end of the second optical function device at the second end portion of the substrate;

means for connecting the output end of the second optical function device at the first end portion of the substrate with the input end of the third optical function device at the second end portion of the substrate; and a polarization beam splitter connecting the input end of the first optical function device at the first end portion of the substrate with the output end of the third optical function device at the first end portion of the substrate.

2. An optical apparatus comprising:

a plurality of optical function devices formed on a same substrate having a first end portion and a second end portion;

connecting means for cascade connecting the plurality of optical function devices, the connecting means having a first end connected to a first one of the optical function devices at the first end portion of the substrate and a second end connected to a last one of the optical function devices at the first end portion of the substrate; and a polarization beam splitter connecting the first end and the second end of the connecting means.

3. The optical apparatus according to claim 2, wherein each optical function device respectively has a first end at the first end portion of the substrate and a second end at the second end portion of the substrate, and the connecting means connects the second end of the first optical function device to the second end of a second one of the optical function devices, connects the first end of each optical function device other than the first optical function device to the second end of each optical function device other than the first optical function device, connects the first end of the first optical function device to the polarization beam splitter, and connects the first end of the last optical function device to the polarization beam splitter.

4. An optical apparatus comprising:

a substrate having a first end portion and an opposing second end portion;

a first optical function device, a second optical function device, and a third optical function device formed on a same substrate;

a cascade connecting section that cascade connects the first optical function device, the second optical function device, and the third optical function device in order, with a direction of light passing through the first optical function device being opposite to a direction of light passing through the second optical function device and the third optical function device, and with both an input end and an output end of an optical path passing through the first optical function device, the second optical function device, and the third optical function device being positioned on a same end face of the substrate after making the cascade connection; and a polarization beam splitter connecting an input end of the first optical function device at the first end portion of the substrate with the output end of the third optical function device at the first end portion of the substrate.

5. The optical apparatus of claim 4, wherein the first optical function device, the second optical function device, and the third optical function device are optical filter devices.

6. The optical apparatus of claim 4, wherein the first optical function device, the second optical function device, and the third optical function device are acousto-optic tunable filters.

7. The optical apparatus of claim 4, wherein the first optical function device, the second optical function device, and the third optical function device are optical switch devices.

8. A method comprising:

cascade connecting a first optical function device, a second optical function device and a third optical function device on a same substrate wherein both an input end and an output end of an optical path passing through the first optical function device, the second optical function device, and the third optical function device are positioned on a same end face of the substrate after making the cascade connection; and connecting an input end of the first optical function device with an output end of the third optical function device via a polarization beam splitter.

* * * * *